US010343230B2

(12) United States Patent
Knoener et al.

(10) Patent No.: US 10,343,230 B2
(45) Date of Patent: Jul. 9, 2019

(54) WELDING-TYPE SYSTEMS AND USER INTERFACES HAVING A COLOR DISPLAY FOR DISPLAYING PHYSICAL SETUP INSTRUCTIONS

(71) Applicant: Illinois Tool Works Inc., Glenview, IL (US)

(72) Inventors: Craig Steven Knoener, Appleton, WI (US); Nicholas James Dessart, Appleton, WI (US); Emily Rose Mueller, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 394 days.

(21) Appl. No.: 15/087,434

(22) Filed: Mar. 31, 2016

(65) Prior Publication Data

US 2017/0282276 A1 Oct. 5, 2017

(51) Int. Cl.
*B23K 9/10* (2006.01)
*B23K 9/32* (2006.01)
(Continued)

(52) U.S. Cl.
CPC ............ *B23K 9/1062* (2013.01); *B23K 9/095* (2013.01); *B23K 9/1006* (2013.01); *B23K 9/32* (2013.01); *B23K 37/006* (2013.01); *G01R 31/02* (2013.01)

(58) Field of Classification Search
CPC ........ B23K 9/1062; B23K 9/095; B23K 9/32; B23K 37/006; B23K 9/1006
(Continued)

(56) References Cited

U.S. PATENT DOCUMENTS

2010/0314371 A1* 12/2010 Davidson ................. B23K 9/10
219/130.1
2012/0291172 A1* 11/2012 Wills ................... B23K 9/0956
2/8.2
(Continued)

FOREIGN PATENT DOCUMENTS

WO 2011058432 5/2011

OTHER PUBLICATIONS

Operator's Manual for Power Mig® 210 MP, IMT10164, Issue Date Dec. 2014, Lincoln Global, Inc., Cleveland, OH (96 pages).
(Continued)

*Primary Examiner* — Thien S Tran
(74) *Attorney, Agent, or Firm* — McAndrews, Held & Malloy, Ltd.

(57) ABSTRACT

Welding-type systems and user interfaces having a color display for displaying physical setup instructions are disclosed. Example interface devices include a process selection input device, a display device, a memory, and a processor. The memory stores weld connection setup graphics and physical welding connections. Each of the plurality of weld connection setup graphics is a graphic of a perspective view of a power supply. The processor, in response to identifying a selected welding process type via the welding process selection input device, displays one of the plurality of the weld connection setup graphics via the display device. The processor detects a physical welding connection made at the power supply, determines, based on the detected physical welding connection, that the detected physical welding connection is incorrect for the selected welding process type, and displays an alert on the display device to indicate an error in the detected physical welding connection.

18 Claims, 11 Drawing Sheets

(51) Int. Cl.
*B23K 37/00* (2006.01)
*B23K 9/095* (2006.01)
*G01R 31/02* (2006.01)

(58) Field of Classification Search
USPC ............ 219/73, 108, 121.48, 130.1, 130.21; 717/104, 106, 109
See application file for complete search history.

(56) References Cited

U.S. PATENT DOCUMENTS

| | | | |
|---|---|---|---|
| 2013/0256289 A1* | 10/2013 | Knoener | G01R 31/02 219/130.21 |
| 2014/0251969 A1 | 9/2014 | Stoner et al. | |
| 2014/0257589 A1* | 9/2014 | Spisic | B23K 9/1006 700/297 |
| 2015/0122781 A1* | 5/2015 | Albrecht | B23K 9/0953 219/73 |
| 2015/0209887 A1* | 7/2015 | DeLisio | B23K 9/0953 219/130.01 |

OTHER PUBLICATIONS

Extended European Search Report for Appln. No. 17153345.8 dated Aug. 25, 2017 (7 pages).
Canadian Office Action Appln No. 2,955,327 dated Oct. 31, 2018 (4 pgs).

* cited by examiner

WELDING-TYPE SYSTEMS AND USER INTERFACES HAVING A COLOR DISPLAY FOR DISPLAYING PHYSICAL SETUP INSTRUCTIONS

BACKGROUND

The present disclosure generally relates to welding-type systems and, more particularly, to welding-type systems and user interfaces having a color display for displaying physical setup instructions.

For the novice welding operator, correctly connecting the welding power source cables is confusing and inconsistent. For example, in GMAW the wire drive assembly is most commonly connected to the positive polarity, but for FACW the wire drive assembly is most commonly connected to the negative polarity. For DC SMAW, the electrode is most commonly connected to the positive polarity, but in DC GTAW the electrode is most commonly connected to the negative polarity.

SUMMARY

Methods and systems are provided for welding-type systems and, more particularly, to welding-type systems and user interfaces having a color display for displaying physical setup instructions, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
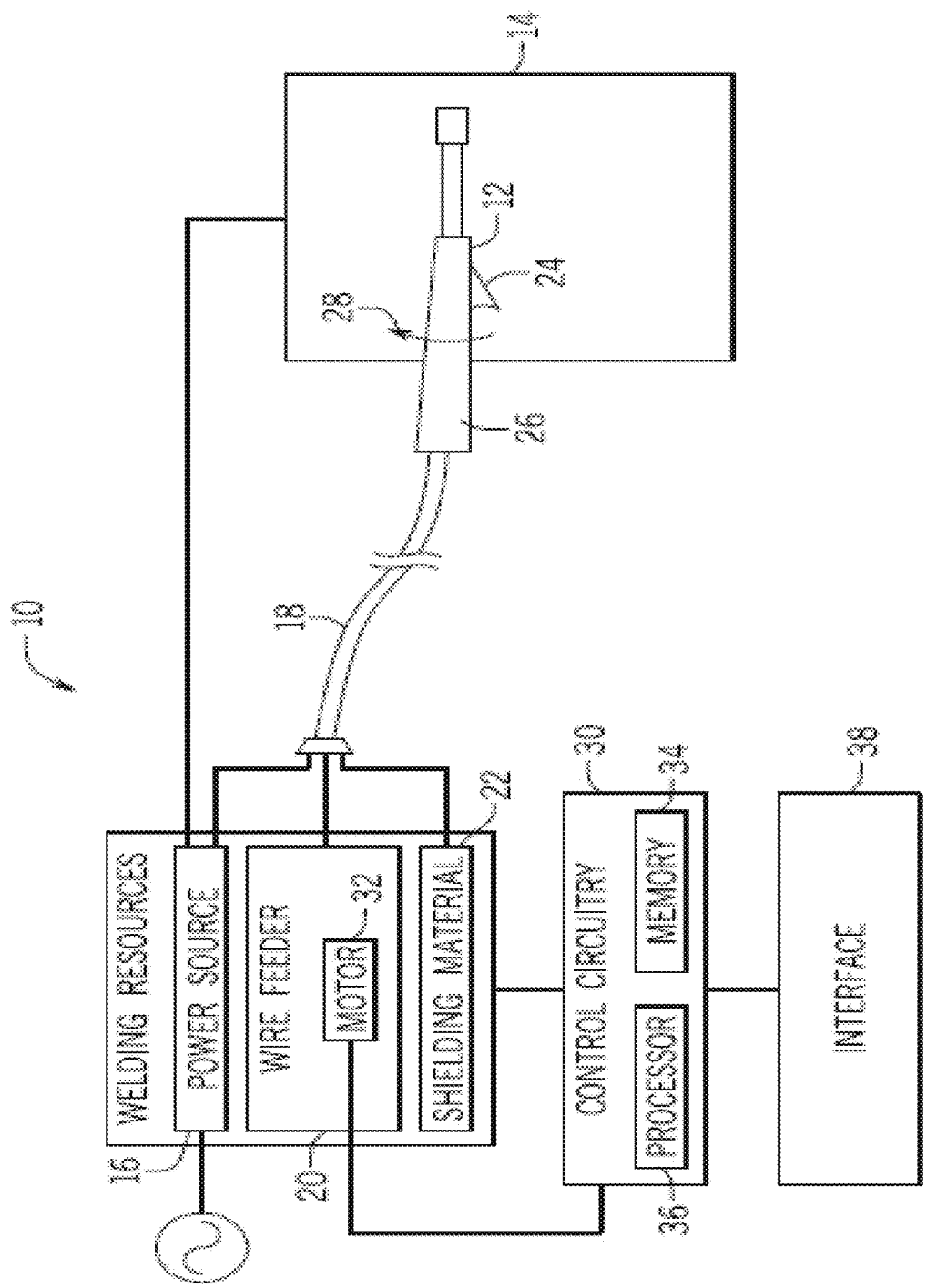
FIG. 1 is a schematic diagram of an embodiment of a welding-type system, wherein an interface is configured to display physical welding connection information of the welding-type system.

Disclosed examples improve the user experience of setting up multi-process welding-type systems. Where conventional systems may cause confusion for novice users of the welding-type systems, disclosed examples show a welding operator a computer-rendered, realistic image for the correct welding cable connections based on determining a selected welding process type. Compared to conventional welding systems, disclosed examples provide images that more clearly represent their system, detect discrepancies between the physical connections made by a user and the physical connections used for the selected welding process type, and display images to illustrate remedial actions to be taken by a user.

Disclosed welding-type power supply interface devices include a welding process selection input device, a display device, a memory, and a processor. The memory stores weld connection setup graphics and physical welding connections to be made by an operator at the welding power supply. Each of the plurality of weld connection setup graphics is a graphic of a perspective view of a welding power supply. The processor, in response to identifying a selected welding process type via the welding process selection input device, displays one of the plurality of the weld connection setup graphics via the display device. The processor detects a physical welding connection made at the welding power supply. Based on the detected physical welding connection, the processor determines that the detected physical welding connection is incorrect for the selected welding process type. The processor displays an alert on the display device to indicate an error in the detected physical welding connection.

In some examples, the one of the plurality of the weld connection setup graphics includes perspective views of first and second physical terminals and a perspective view of a weld torch corresponding to the selected welding process type. In some examples, the processor determines that the detected physical welding connection is incorrect by determining terminal connection data corresponding to the one of the plurality of the weld connection setup graphics, and determining that an actual weld torch is connected to a first terminal that is different than a second terminal depicted in the one of the plurality of the weld connection setup graphics based on the terminal connection data and based on the detected physical welding connection. In some examples, the processor displays display alert on the display device by displaying an animation that illustrates changing the detected physical welding connection to a correct physical welding connection matching the terminal connection data.

In some examples, the processor displays the alert on the display device by displaying an updated graphic to visually indicate a location of the error. In some examples, the processor flashes a component of the updated graphic corresponding to the error on the display device. In some examples, the one of the plurality of the weld connection setup graphics is an animation illustrating the physical welding connection at the welding power supply. Some example welding power supply interface devices further include a second input device, and the processor identifies a current user of the welding power supply based on a first input from the second input device. The processor also compares a first number of times the one of the plurality of the weld connection setup graphics has been displayed while the current user is logged in to the welding power supply to a display threshold, and displays the one of the plurality of the weld connection setup graphics when the first number does not satisfy the display threshold.

In some examples, the processor identifies the current user of the welding power supply based on a second input from the second input device after the first input, and displays weld operating parameters corresponding to the selected welding process type on the display device without displaying the one of the plurality of the weld connection setup graphics, when the first number satisfies the display threshold.

Some example welding power supply interface devices further include a communications device that communicates with the welding power supply via wired communications or wireless communications. In some examples, the display device comprises a color display device. In some examples, the one of the plurality of the weld connection setup graphics includes at least one of a first connection between a weld cable and a positive polarity or negative polarity power supply terminal, a second connection between a weld cable and a wire feeder, or a third connection between a work clamp and the positive polarity or the negative polarity power supply terminal.

Disclosed example welding-type power supplies include a power source to provide welding power to a welding process, a welding process selection input device, a display device, a memory, and a processor. The memory stores a plurality of weld connection setup graphics. Each of the plurality of weld connection setup graphics is a graphic of a perspective view of the welding power supply and one or more physical welding connections to be made by an operator at the welding power supply to set up the welding power supply to perform a corresponding welding process type. The processor, in response to identifying a selected welding process type via the welding process selection input device, retrieves one of the plurality of the weld connection setup graphics from the memory. The processor also displays the one of the plurality of the weld connection setup graphics via the display device. The processor detects a physical welding connection made at the welding power supply, and determines, based on the detected physical welding connection, that the detected physical welding connection is incorrect for the selected welding process type. The processor displays an updated graphic on the display device to visually indicate a location of an error in the detected physical welding connection.

In some examples, the one of the plurality of the weld connection setup graphics includes perspective views of first and second physical terminals and a perspective view of a weld torch corresponding to the selected welding process type. In some examples, the processor determines that the detected physical welding connection is incorrect by: determining terminal connection data corresponding to the one of the plurality of the weld connection setup graphics and determining that an actual weld torch is connected to a first terminal that is different than a second terminal depicted in the one of the plurality of the weld connection setup graphics based on the terminal connection data and based on the detected physical welding connection.

In some examples, the processor displays display alert on the display device by displaying an animation that illustrates changing the detected physical welding connection to a correct physical welding connection matching the terminal connection data. In some examples, the processor displays the alert on the display device by displaying an updated graphic to visually indicate a location of the error. In some examples, the processor flashes a component of the updated graphic corresponding to the error on the display device. In some examples, the one of the plurality of the weld connection setup graphics is an animation illustrating the physical welding connection at the welding power supply.

Some example welding power supplies further include a second input device, and the processor identifies a current user of the welding power supply based on a first input from the second input device and compares a first number of times the one of the plurality of the weld connection setup graphics has been displayed while the current user is logged in to the welding power supply to a display threshold. The processor displays the one of the plurality of the weld connection setup graphics when the first number does not satisfy the display threshold.

In some examples, the processor identifies the current user of the welding power supply based on a second input from the second input device after the first input and displays weld operating parameters corresponding to the selected welding process type on the display device, without displaying the one of the plurality of the weld connection setup graphics, when the first number satisfies the display threshold. In some examples, the one of the plurality of the weld connection setup graphics includes at least one of a first connection between a weld cable and a positive polarity or negative polarity power supply terminal, a second connection between a weld cable and a wire feeder, or a third connection between a work clamp and the positive polarity or the negative polarity power supply terminal.

As used herein, the term "rendered graphic" refers to a graphical representation of a scene generated from one or more data objects. A graphic may be rendered from data using one or more of geometry, viewpoint, texture, lighting, and/or shading information. In some examples, a rendered graphic is a two-dimensional image. A rendered graphic can be stored and/or retrieved as image data after being rendered. As used herein, the term "graphic" includes any graphically displayed information, such as drawn images, photographs, photorealistic rendered graphics, two-dimensional rendered graphics, three-dimensional rendered graphics, videos, animations (e.g., sequences of graphics that provide an illusion of motion), and/or any other type of image.

Turning now to the figures, FIG. 1 illustrates a welding-type system 10 that includes a welding torch 12 that defines the location of a welding operation with respect to a work piece 14. Welding-type system, as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith. Placement of the welding torch 12 at a location proximate to the work piece 14 allows electrical current provided by a power source 16, which converts incoming alternating current (AC) power to an appropriate direct current (DC), pulsed DC, and/or (AC) power. The DC, pulsed DC, and/or AC power is routed to the welding torch 12 via a welding torch cable 18, to arc from the welding torch 12 to the work piece 14. In summary, this arcing completes an electrical circuit from the power source 16, to the welding torch 12 via the welding torch cable 18, to an electrode, to the work piece 14, and at its conclusion, back to the power source 16. This arcing generates a relatively large amount of heat causing the work piece 14 and/or filler metal to transition to a molten state, facilitating creation of a weld.

To produce electrical arcing, the exemplary welding-type system 10 includes a wire feeder 20 that provides a consumable wire electrode to the welding torch cable 18 and, in turn, to the welding torch 12. The welding torch 12 conducts electrical current to the wire electrode via a contact tip (not shown) located in a neck assembly of the welding torch 12, leading to arcing between the egressing wire electrode and the work piece 14.

To shield the weld area from contaminants during welding, to enhance arc performance, and to improve the resulting weld, in certain embodiments, the exemplary welding-type system 10 includes a gas source 22 that feeds an inert shielding gas to the welding torch 12 via the welding torch cable 18. It is worth noting, however, that a variety of shielding materials, including various fluids and particulate solids, may be employed to protect the weld location. Additionally, certain wire electrodes are designed to operate without a shielding material.

Advancement of these welding resources (e.g., welding current, wire electrode, and shielding gas) is effectuated by actuation of a trigger 24 secured to a handle 26 of the welding torch 12. By depressing the trigger 24 (arrow 28), a switch disposed within the trigger 24 is closed, causing the transmission of an electrical signal that commands promotion of the welding resources into the welding torch cable 18. For example, depressing the trigger 24 sends a signal to control circuitry 30, which, in turn, activates a motor 32 that advances wire electrode into the welding torch cable 18, opens a valve to allow the flow of shielding material, and commands the power source 16 to output the desired level of power to the wire electrode. In certain embodiments, the control circuitry 30 includes memory components 34, to store programming instructions, command programs, appropriate data, etc. In certain embodiments, the control circuitry 30 also includes a processing device, such as a processor 36, among other types of processing devices, to effectuate control of the welding-type system 10.

To adjust operating parameters of the welding-type system 10, a user interface 38 may be included as part of the welding-type system 10. The user interface 38 is the means by which a user or an operator interacts with the welding-type system 10. The user interface 38 may include input devices such as a keypad, stylus, pushbuttons, dials, or any form of transducer that converts a physical interaction with the user interface 38 into an electrical signal input. However, as described herein, in certain embodiments, the user interface 38 may also include a color display screen to display color graphical representations of input and output devices such as buttons, icons, text, windows, and similar features relating to the setting and displaying of welding parameters. For example, the user interface 38 may be a graphical interface, and may display color graphical indicators of welding parameters such as voltage, amperage, and wire-feed speed in varying colors. In addition, instead of (or in addition to) physical input devices for receiving inputs from a user, in certain embodiments, the color display screen described herein may display user input elements, such as buttons, sliders, knobs, and so forth, for receiving inputs from the user.

Figure 2:
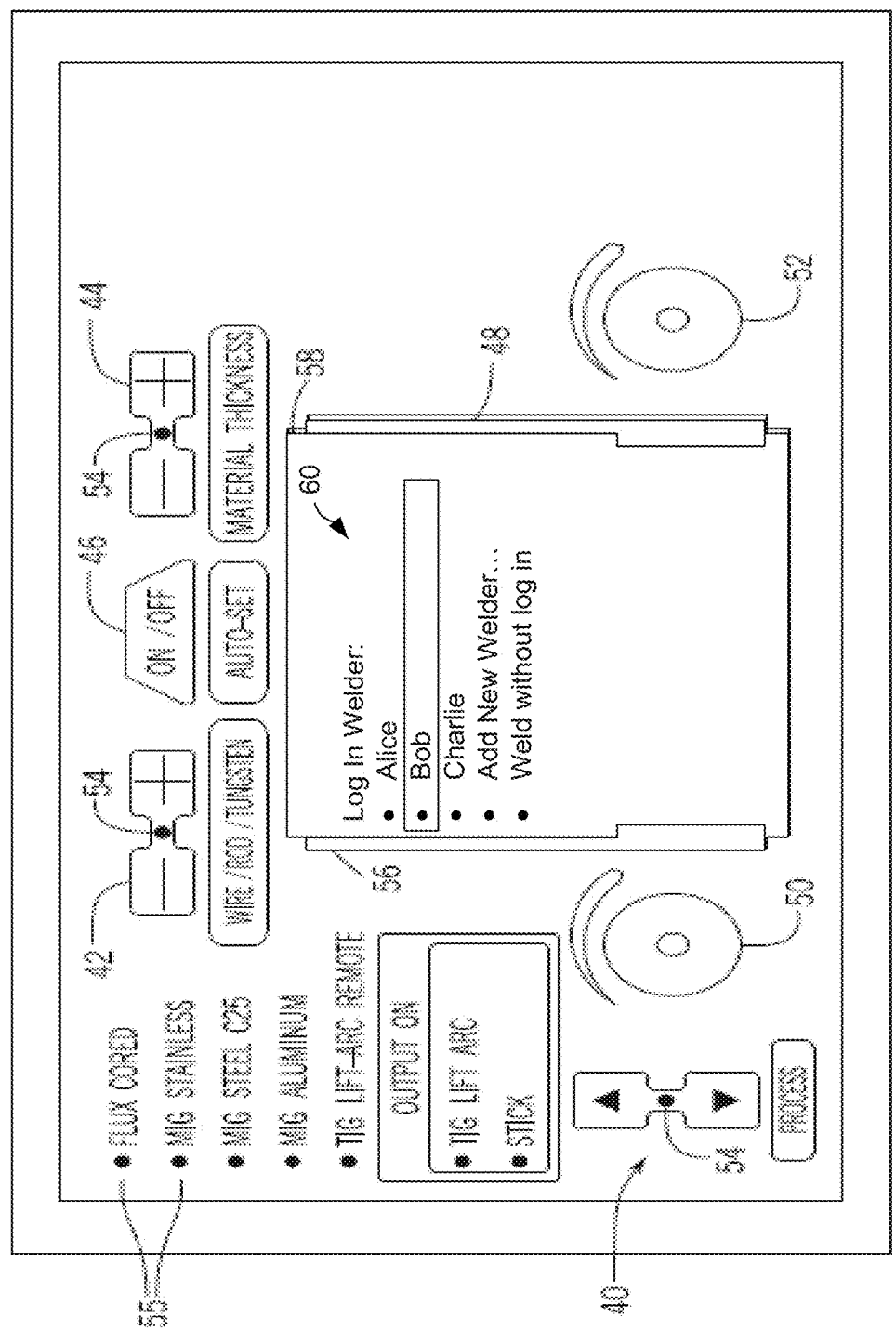
FIG. 2 is a front view of an example implementation of the interface for logging in a welder to the welding-type system of FIG. 1.

FIG. 2 is a front view of an example implementation of the interface 38 for logging in a welder to the welding-type system of FIG. 1. The example user interface 38 includes a welding process selector 40, an electrode diameter adjustor 42, a material thickness adjustor 44, an Auto-Set selector 46, a color display screen 48, and voltage and wire-feed speed and/or amperage adjust dials 50 and 52, respectively. For further purpose of illustration, FIG. 2 will be referenced in the discussion of the aforementioned components of the user interface 38. Where appropriate, the same reference numbers are used to identify the same components between different figures.

The welding process selector 40 permits an operator (e.g., a welder) or other user to select from a plurality of welding processes. For example, as depicted in FIG. 2, the welding process selector 40 permits an operator to choose from welding processes, such as a stick welding process, a flux-cored welding process, one or more metal inert gas (MIG) welding processes, one or more tungsten inert gas (TIG) welding processes, and so forth. In addition to general welding processes, in some examples, the welding process selector 40 permits the operator to select the material of the welding electrode. For example, as depicted in FIG. 2, in desiring to implement a MIG welding process, the operator may further select, for example, a stainless steel, another type of steel, or aluminum electrode for implementing the MIG process. In some examples, the welding process selector 40 may also allow an operator to select a desired welding process (e.g., stick, MIG, TIG, etc.), electrode material type (e.g., steel, aluminum, etc.), and gas type (e.g., C25, C100, Argon, etc.), and subsequently elect to enable the Auto-Set function of the welding-type system 10 to automatically set the appropriate voltage and wire-feed speed and/or amperage welding parameters. The Auto-Set functionality is described in greater detail in U.S. Pat. No. 8,604,389, which is assigned to Illinois Tool Works Inc. The entirety of U.S. Pat. No. 8,604,389 is incorporated herein by reference.

The electrode diameter adjustor 42 enables the operator to specify an electrode diameter of an electrode used in welding (e.g., an electrode wire, an electrode rod, or tungsten electrode, depending on the type of welding process type selected). The electrode diameter is an important parameter in performing welds, as the suitable generated amperage of the welding arc is dependent upon the diameter of the electrode wire. In certain embodiments, the electrode diameter adjustor 42 may feature, for example, a "+" pushbutton to increase the electrode diameter setting and a "−" pushbutton to decrease the electrode diameter setting as depicted. Similarly, the user interface 38 may also include a material thickness adjustor 44, which may also, for example, include a "+" pushbutton to increase the material thickness setting (e.g., relating to the work piece 14 that is being welded upon) and a "−" pushbutton to decrease the material thickness setting. The electrode diameter and material thickness settings, in conjunction, have an effect on the voltage and amperage (i.e., electrical current) required to perform a given welding procedure. In certain embodiments, an operator or other user may select the Auto-Set function via the Auto-Set selector 46. When the Auto-Set feature is enabled, the operator may only be required to input the respective electrode diameter and material thickness settings for the power source 16 to automatically adjust (e.g., increase or decrease) voltage, wire-feed speed, and/or amperage parameters to appropriate settings.

The Auto-Set selector 46 may be, for example, an on/off electrical switch or on/off pushbutton, which may be activated or deactivated, allowing an operator to simply enable or disable the Auto-Set function of the welding-type system 10. In certain embodiments, the user interface 38 may include one or more light indicators 54 (e.g., LEDs in certain embodiments) to indicate whether the Auto-Set function is enabled or disabled. For example, in performing a MIG welding process, the operator may select the Auto-Set function, via the Auto-Set selector 46 and the one or more light indicators 54 may display a blue light, for example, or other indication to the operator that the Auto-Set function is enabled. Similarly, in certain embodiments, the welding process selector 40 may be associated with a plurality of light indicators 55, each light indicator 55 being spatially aligned with a label corresponding to a respective welding process (e.g., "FLUX-CORED", "MIG STAINLESS", and so forth) such that manipulation of the welding process selector 40 changes the selected welding process, and the light indicator 55 that corresponds to the selected welding process may display a blue light, for example, or other indication to the operator that the particular welding process has been selected, while the other light indicators 55 corresponding to the other welding processes are not illuminated.

Corresponding to the aforementioned electrode diameter adjustor 42, material thickness adjustor 44, and Auto-Set selector 46, the user interface 38 includes a color display screen 48. The example color display screen 48 may be a single liquid crystal display (LCD) screen and/or any other display device capable of displaying visual graphical objects and/or alphanumeric texts relating to the setting of welding parameters, real-time operational statuses of the welding-type system 10, and so forth. In some examples, the welding process selector 40, the electrode diameter adjustor 42, the material thickness adjustor 44, the Auto-Set selector 46, the welding parameter adjustment dials 50 and 52, or any combination thereof, may be displayed as graphical input devices on the color display screen 48. For example, the color display screen 48 may be a touch screen configured to receive inputs from a user via such graphical input devices that are displayed on the color display screen 48. In other words, instead of (or in addition to) actual physical input devices disposed on the user interface 38, other types of user input elements, such as graphical buttons, sliders, knobs, and so forth, displayed via the color display screen 48 may be used to receive inputs from a user.

Upon power-up of the welding-type system 10, a message may be automatically displayed via the color display screen 48 prompting an operator, for example, to enable the Auto-Set function via the Auto-Set selector 46. In the case that the operator selects the Auto-Set function by activating the Auto-Set selector 46, one or more messages subsequently prompt the operator to select both the electrode diameter and material thickness settings via the electrode diameter adjustor 42 and the material thickness adjustor 44, respectively. Similarly, in some examples messages are automatically displayed via the color display screen 48 such as, for example, when an operator changes or switches welding processes via the welding process selector 40. These messages may include graphical depictions of the physical connections that are to be made by the welder or operator of the welding-type system 10 for the selected welding process type. In certain embodiments, the text of such messages may be displayed on the color display screen 48 in larger than usual fonts, in colors (e.g., red, etc.) different than usual text colors (e.g., white text on a black background, or vice versa), and/or in association with colors graphics (e.g., red exclamation marks, etc.) such that the attention of the user may be better attracted. In some examples, messages are displayed that provide supplemental guidance relating to appropriate welding settings (e.g., relating to shielding gases to be used, polarities to be used, and so forth) to operators or users of the welding-type system 10, and thus ensure that welds are performed appropriately.

The Auto-Set selector 46 of the user interface 38 enables and/or disables the Auto-Set function of the welding-type system 10. When Auto-Set is enabled, the power source 16 automatically sets welding voltage, welding amperage, and wire-feed speed for a plurality of welding processes, electrode material types, and shielding gas types. When Auto-Set is disabled, the power source 16 determines acceptable ranges of values for the welding voltage, welding amperage, and wire-feed speed, thus allowing an operator to manually adjust the parameters within the acceptable ranges of values.

On initialization of the welding-type system 10, the example interface 38 displays a welder selection interface 60. The example welding selection interface 60 enables a welder to log in, which causes the welding-type system 10 to load prior welding information about the logged in welder. Example prior welding information includes a number of times the welder has logged in and used the welding-type system 10, and the number of times setup instructions have been presented to the logged in welder. The number of times that setup instructions have been presented to the logged in welder may be separately tracked by the welding-type system 10 and stored in the memory 34 for each welding process type that can be performed by the welding-type system 10. Additionally or alternatively, a user may set preferences indicating that one or more of the process types, when selected, should not cause the welding-type system 10 to display setup instructions (e.g., because the user feels sufficiently familiar with the process type not to require such instructions).

Figure 3:
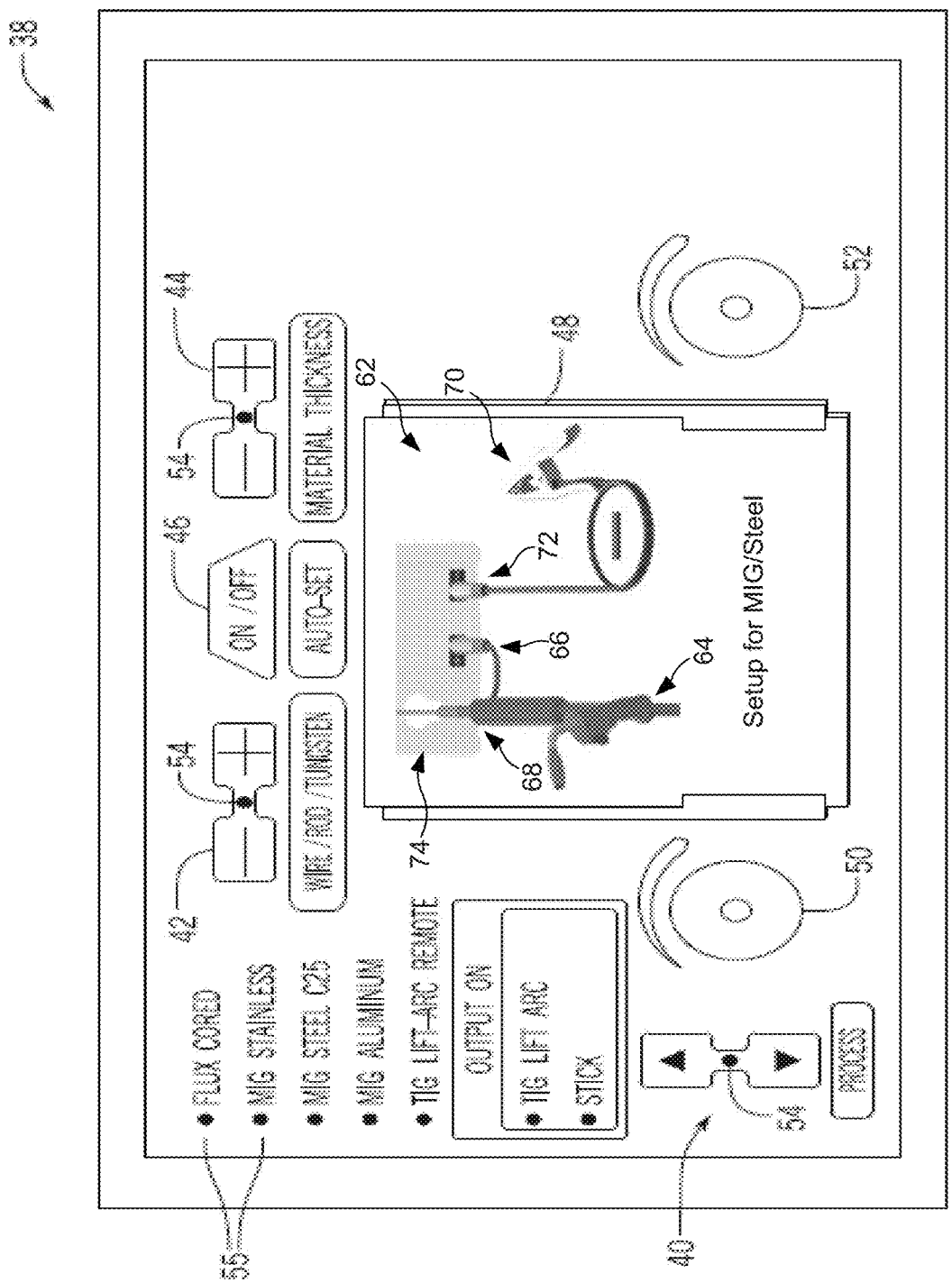
FIG. 3 is a front view of an example implementation of the interface for displaying physical welding connection information in response to selection of a MIG process type at the welding-type system.

FIG. 3 is a front view of an example implementation of the interface 38 for displaying physical welding connection information in response to selection of a MIG process type at the welding-type system 10. As illustrated in FIG. 3, the interface 38 includes a rendered image 62 of a MIG gun 64 connected to a positive voltage terminal 66 of the welding type system 10 and to a wire feed connection 68, and of a work clamp 70 connected to a negative voltage terminal 72 of the welding type system 10. As depicted on the interface 38, the welding-type system 10 is rendered in the image 62 to represent the physical form factor 74 of the welding-type system 10. In some examples, the welding cable connections include the work clamp and cable, wire drive assembly cable, GTAW torch, SMAW stringer, GMAW welding gun, and GMAW spoolgun. The physical form factor 74 is translucent to deemphasize the welding power source and emphasize the welding cables. In some examples, positive polarity welding cables are shown in red (or another first color, which may correspond to a color specified in an electrical code or standard) to emphasize the positive polarity and negative polarity welding cables are shown in black (or another second color, which may correspond to a color specified in an electrical code or standard) to emphasize the negative polarity.

Figure 4:
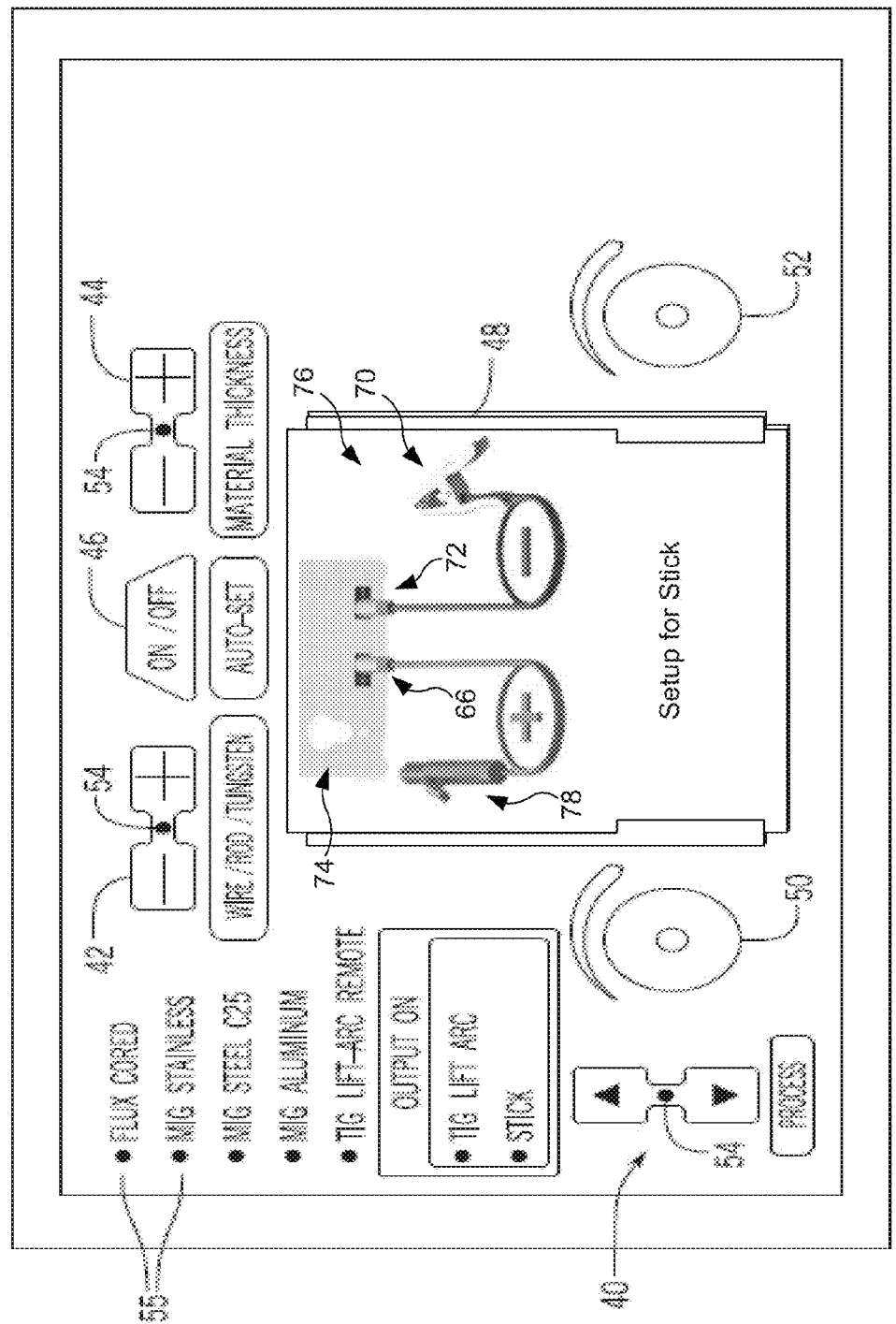
FIG. 4 is a front view of an example implementation of the interface for displaying physical welding connection information in response to selection of a stick or SMAW process type at the welding-type system.

FIG. 4 is a front view of an example implementation of the interface 38 for displaying physical welding connection information in response to selection of a stick or SMAW process type at the welding-type system 10. As illustrated in FIG. 4, the interface 38 includes a rendered image 76 of a stick electrode holder 78 connected to the positive voltage terminal 66 of the welding-type system 10, and of the work clamp 70 connected to the negative voltage terminal 72 of the welding-type system 10.

Figure 5:
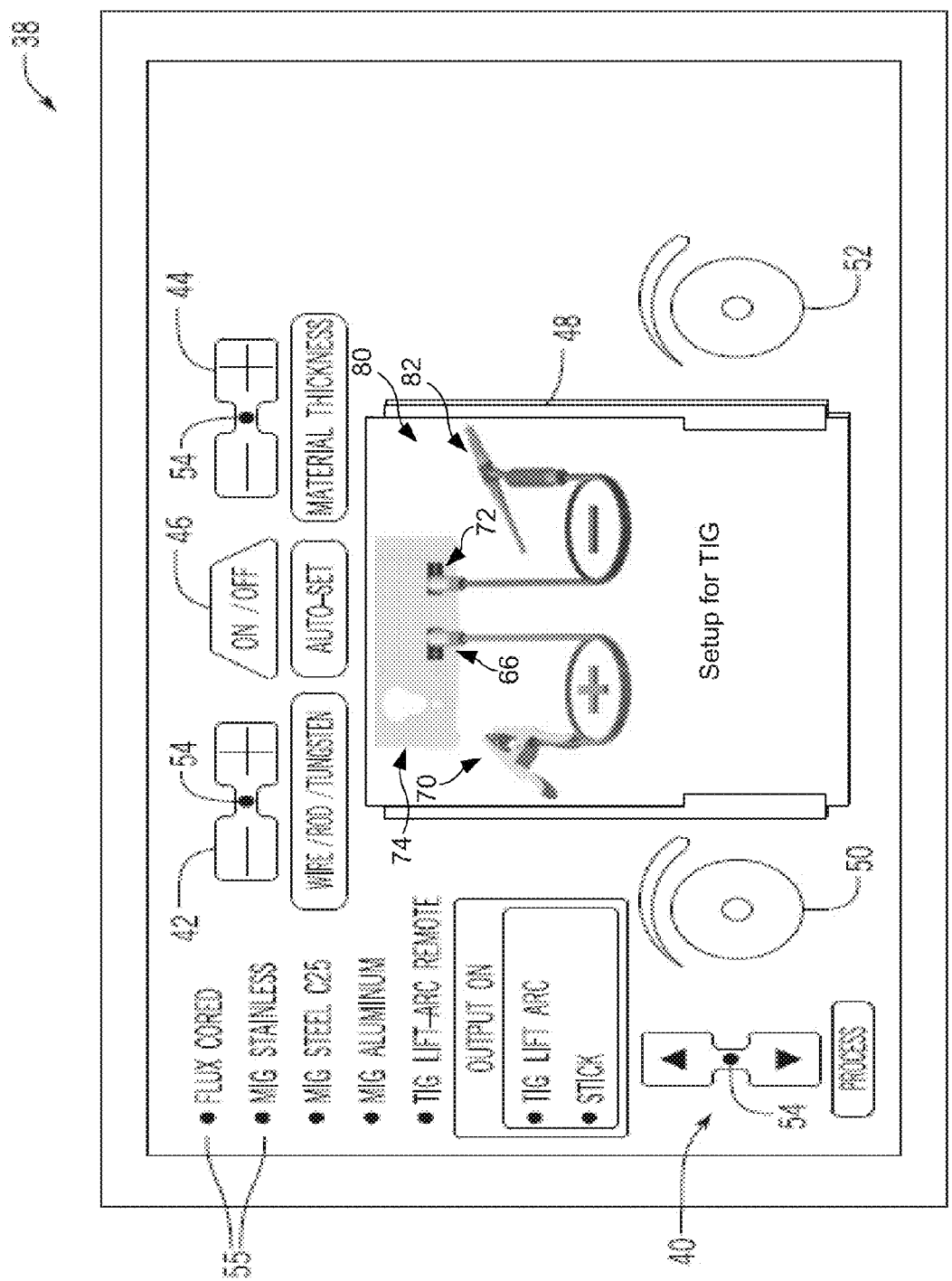
FIG. 5 is a front view of an example implementation of the interface for displaying physical welding connection information in response to selection of a TIG process type at the welding-type system.

FIG. 5 is a front view of an example implementation of the interface 38 for displaying physical welding connection information in response to selection of a TIG process type at the welding-type system 10. As illustrated in FIG. 5, the interface 38 includes a rendered image 80 of a TIG torch 82 connected to the negative voltage terminal 72 of the welding-type system 10, and of the work clamp 70 connected to the positive voltage terminal 66.

Figure 6:
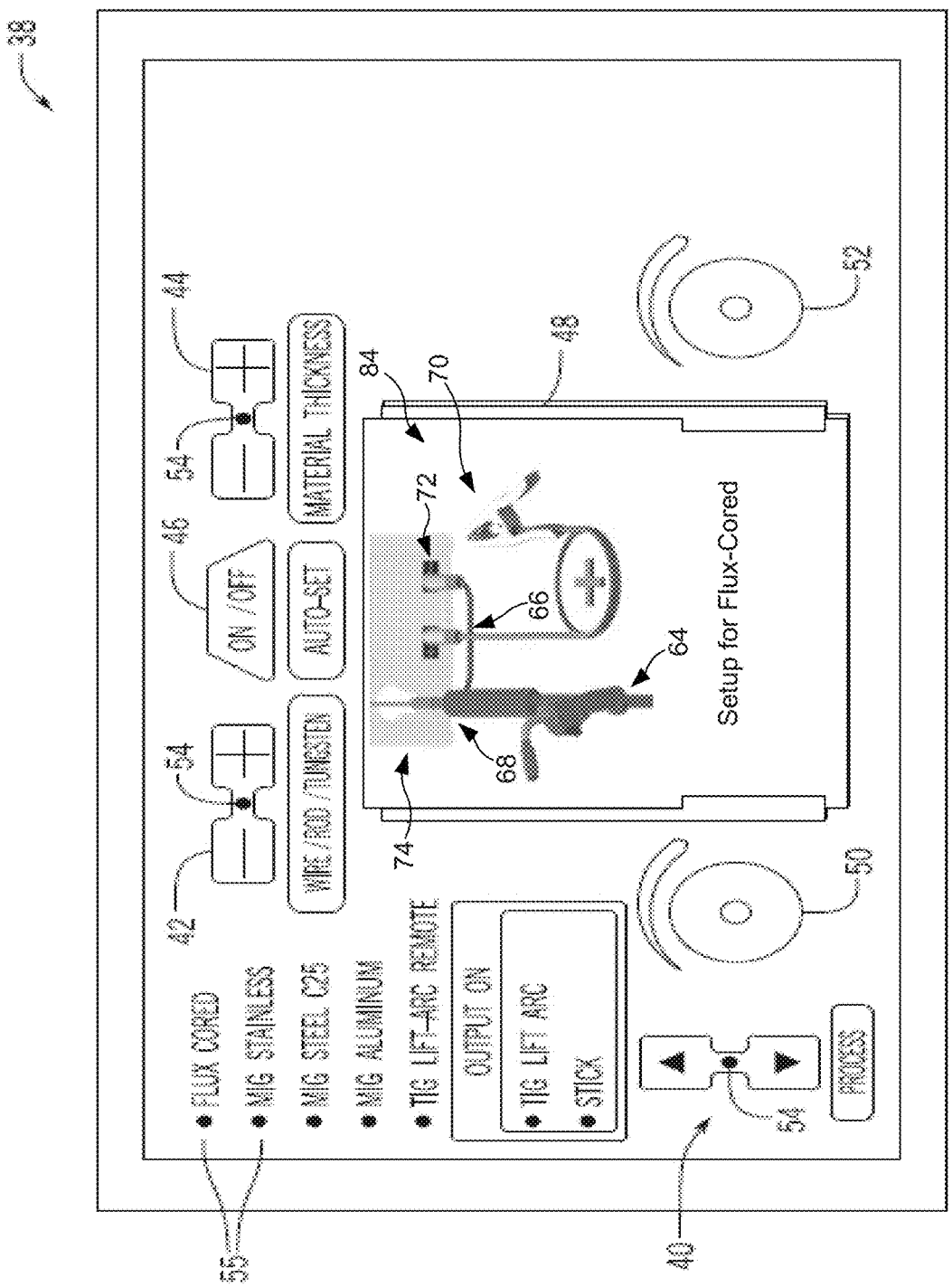
FIG. 6 is a front view of an example implementation of the interface for displaying physical welding connection information in response to selection of a flux-cored wire process type at the welding-type system.

FIG. 6 is a front view of an example implementation of the interface 38 for displaying physical welding connection information in response to selection of a flux-cored wire process type at the welding-type system 10. As illustrated in FIG. 6, the interface 38 includes a rendered image 84 of the MIG gun 64 connected to the negative voltage terminal 72 of the welding type system 10 and to the wire feed connection 68, and of the work clamp 70 connected to the positive voltage terminal 66 of the welding type system 10.

Figure 7:
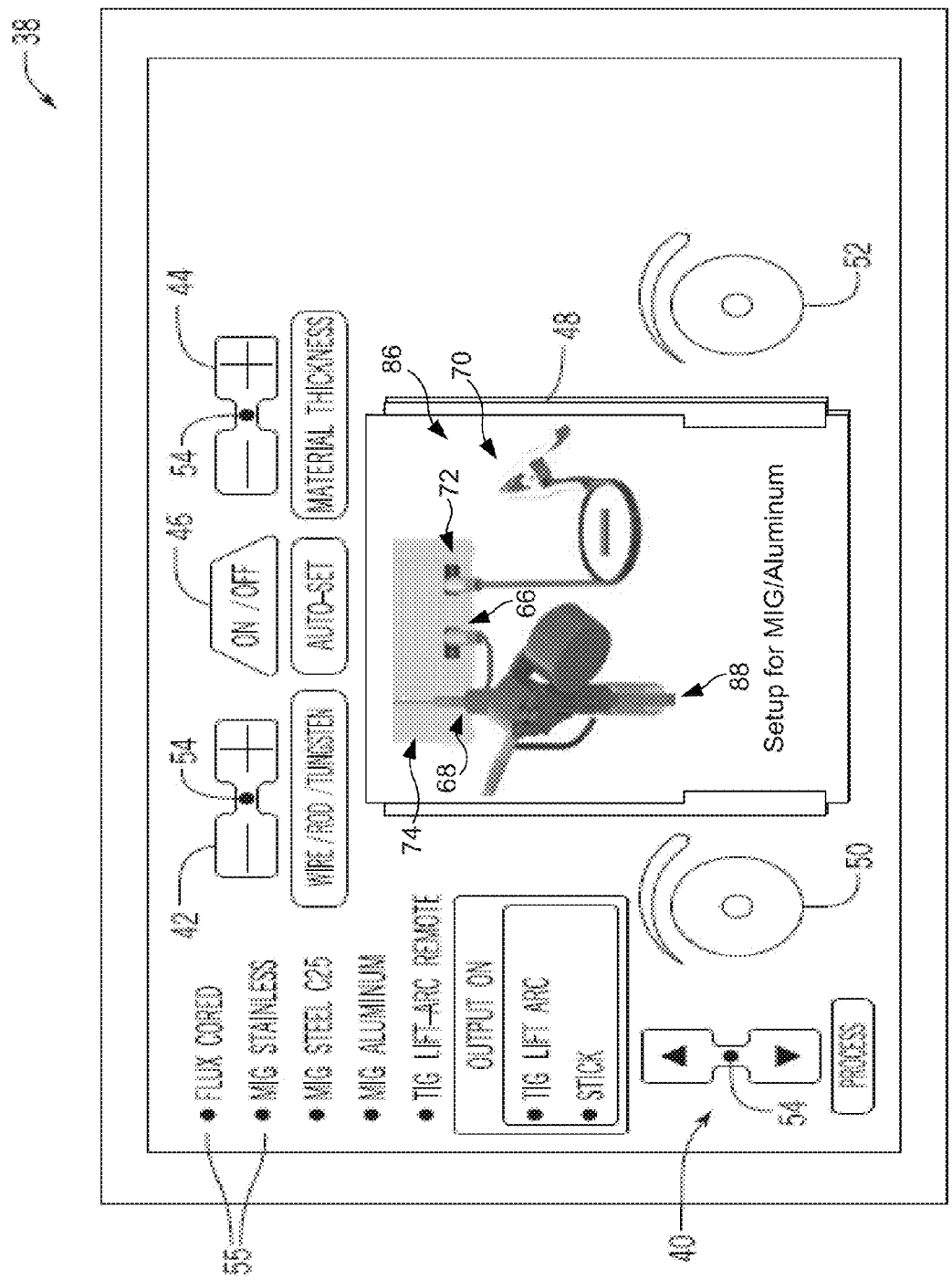
FIG. 7 is a front view of an example implementation of the interface for displaying physical welding connection information in response to selection of a MIG process type using aluminum wire at the welding-type system.

FIG. 7 is a front view of an example implementation of the interface 38 for displaying physical welding connection information in response to selection of a MIG process type using aluminum wire at the welding-type system 10. As illustrated in FIG. 6, the interface 38 includes a rendered image 86 of a spool gun 88 connected to the positive voltage terminal 66 of the welding type system 10 and to the wire feed connection 68, and of the work clamp 70 connected to the negative voltage terminal 72 of the welding type system 10.

Figure 8:
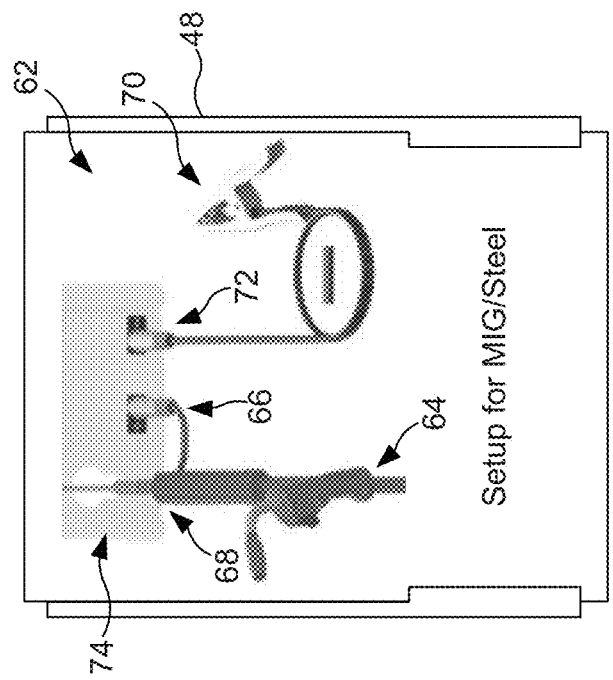
FIG. 8 is a view of an example implementation of the interface for displaying graphics identifying a corrective action to be taken for a physical welding connection at the welding-type system.
Figure 8:
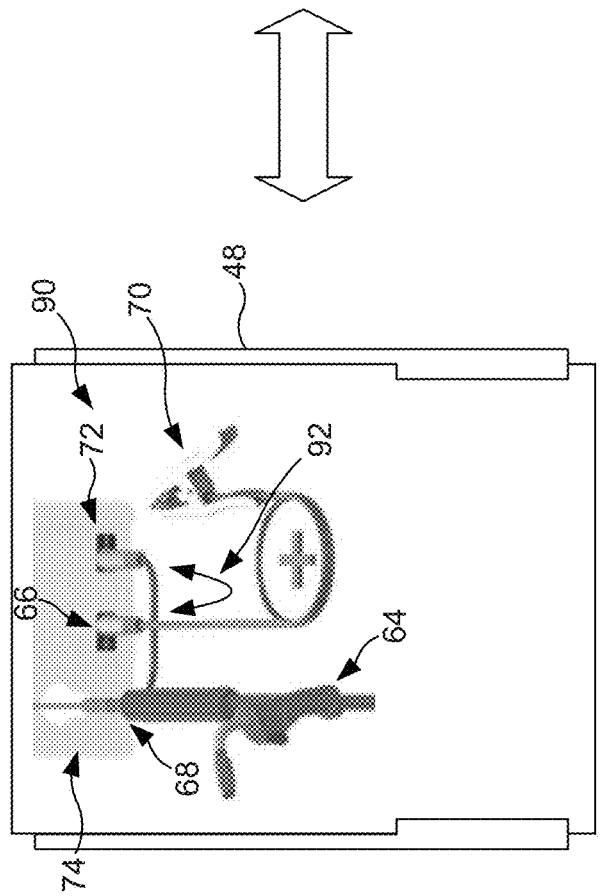

FIG. 8 is a view of an example implementation of the interface 38 for displaying graphics identifying a corrective action to be taken for a physical welding connection at the welding-type system 10. The example welding-type system 10 (e.g., via the processor 36 of FIG. 1) detects the physical welding connection made at the welding-type power source 16 (i.e., by the user). Based on the detected physical welding connection, the welding-type system 10 determines that the detected physical welding connection is correct or incorrect for the selected welding process type. For example, the processor 36 may identify and/or retrieve terminal connection data corresponding to the selected welding process type and/or the displayed weld connection setup graphic.

Example terminal connection data may include identifiers of components that are to be connected to each of the terminals. The physical connections made by the user at the terminals of the welding-type system 10 may be identified by, for example, testing resistor-based identifiers electrically connected to the terminal connections of the weld guns and/or work clamps. Additionally or alternatively, the welding-type system may identify a welding gun based on a type of connector and/or based on an impedance of the welding gun, and identify the terminal (e.g., positive voltage terminal, negative voltage terminal) to which the connection is made. An example method to identify a type of welding gun is described in U.S. Pat. No. 6,855,914, assigned to Illinois Tool Works Inc. The entirety of U.S. Pat. No. 6,855,914 is incorporated herein by reference. Example methods to perform polarity detection are described in U.S. Patent Publication No. 2013/0256289, assigned to Illinois Tool Works Inc. The entirety of U.S. Patent Publication No. 2013/0256289 is incorporated herein by reference.

The welding-type system 10 determines, for example, whether the actual weld torch is connected to a one of the terminals (e.g., the positive voltage terminal 66, the wire feed connection 68, the negative voltage terminal 72) that is different than the terminal identified in the terminal connection data and/or depicted in the displayed weld connection setup graphic on the interface. For example, the welding-type system 10 may compare the terminal connection data to the detected physical welding connection.

When the welding-type system 10 determines that the detected physical welding connection does not comply with the terminal connection data, the color display screen 48 displays one or more updated graphics to visually indicate a location of an error in the detected physical welding connection. As illustrated in FIG. 8, the interface 38 iterates between displaying a rendered correction graphic 90 and the rendered image 62 for the MIG process (e.g., displays the correction graphic 90 for a short time, then displays the rendered image 62 for a short time, and repeats). The correction graphic 90 illustrates the detected physical welding connection which, in the example of FIG. 8, includes the MIG gun 64 being connected to the negative voltage terminal 72 of the welding type system 10 and to the wire feed connection 68, and the work clamp 70 being connected to the positive voltage terminal 66 of the welding type system 10.

The example rendered graphic 90 also identifies, via an indicator 92 (e.g., an arrow), the change in the connection that is to be made. In the example of FIG. 8, the indicator 92 illustrates that the connections at the positive voltage terminal 66 and the negative voltage terminal 72 are to be switched. In some other examples, such as if the incorrect weld gun is used (e.g., a MIG gun is connected when a spool gun is to be used), the indicator 92 may flash the detected incorrect component (e.g., the MIG gun).

As mentioned above, the color display screen 48 switches between the rendered correction graphic 90 and the rendered image 62. The welding-type system 10 may repeatedly switch between the rendered correction graphic 90 and the rendered image 62.

Figure 9:
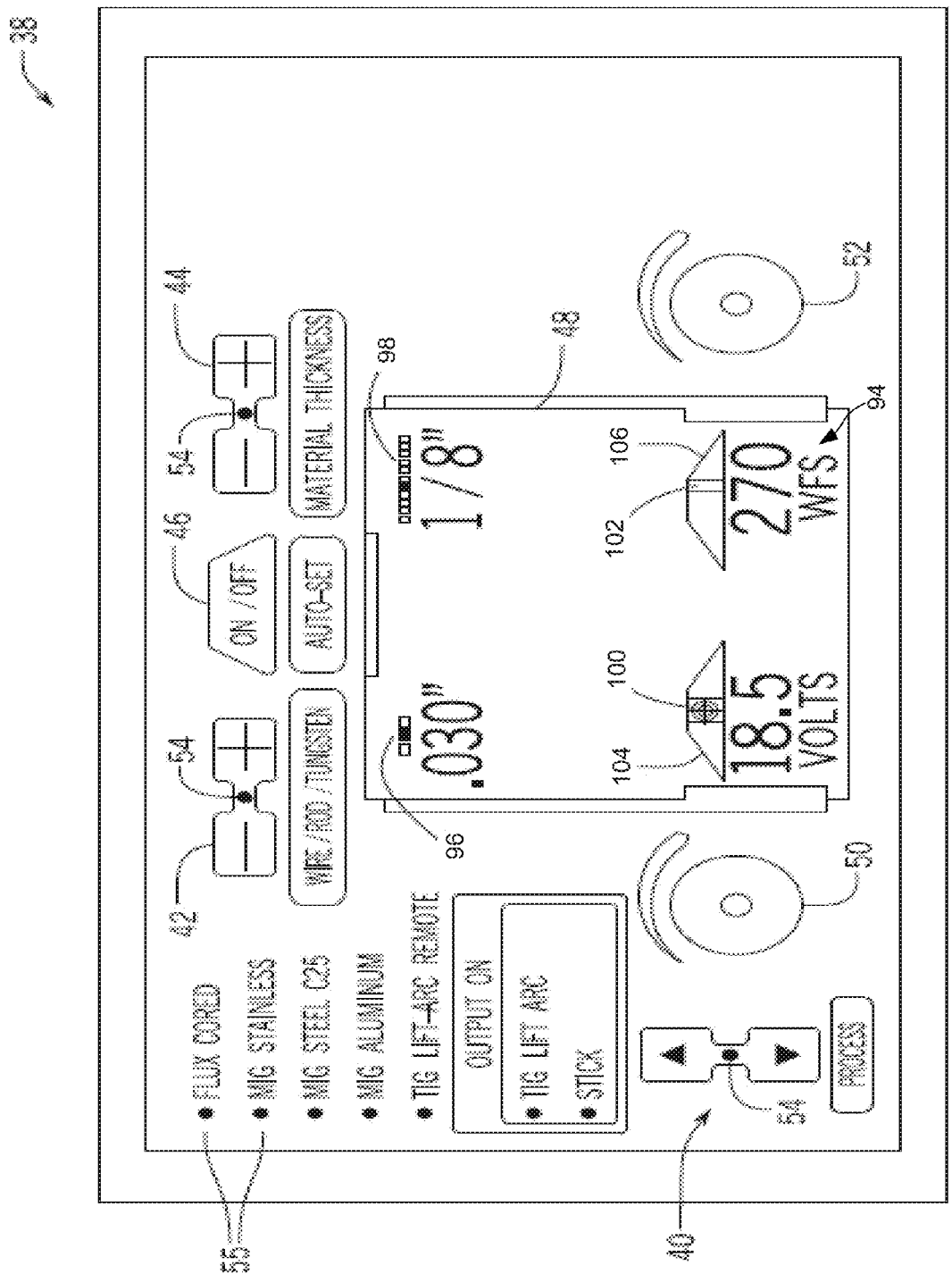
FIG. 9 is a front view of an embodiment of the interface for a MIG or flux-cored welding process including Auto-Set welding parameters after the welding-type power source has enabled welding in response to identifying a correct physical welding connection at the welding-type system.

FIG. 9 is a front view of an embodiment of the interface 38 for a MIG or flux cored welding process including Auto-Set welding parameters after the welding-type system has enabled welding in response to identifying a correct physical welding connection at the welding-type system 10. When the correct physical welding connections have been identified by the welding-type system 10, the interface 38 changes to a welding display screen 94 to display and/or select additional welding parameters associated with the selected welding process type.

As depicted in FIG. 9, the color display screen 48 displays a selected electrode diameter 96 (e.g., 0.030"), a material thickness 98 (e.g., ⅛"), a power source welding voltage 100 (e.g., 18.5 volts), and wire-feed speed 102 (e.g., 270 inches per minute). The color display screen 48 displays a voltage range 104 corresponding to the power source welding voltage 100 and a wire-feed speed range 106 corresponding to the wire-feed speed 102.

The color display screen 48 automatically displays acceptable ranges of values of welding voltages and wire-feed speeds and/or amperages based on inputs of the required electrode diameter and/or material thickness parameters (e.g., which are set based upon manipulation of the electrode diameter adjustor 42 and the material thickness adjustor 44). As used herein, an acceptable welding parameter value range refers to a range of values within which the power source 16 holds the voltage and wire-feed speed and/or amperage in response to an entered or estimated value of the electrode diameter and material thickness parameters, such that a weld may be effectively executed. For example, as depicted in FIG. 9, a welding operator may input an electrode diameter of 0.030" and a material thickness of ⅛" via the user interface 38. The power source 16 may in response, for example, automatically set 18.5 volts and 270 inches per minute as appropriate welding parameter settings to effectively execute a weld for these particular electrode diameter and material thickness characteristics. The appropriate welding parameters may then be displayed via the color display screen 48. The user interface 38 also includes welding parameter adjustment dials 50 and 52, which may be used to manually adjust (e.g., increase or decrease) the voltage and wire-feed speed parameters and/or amperage parameter within acceptable ranges of values, depending on the particular type of welding process selected using the welding process selector 40.

When a user selects a different welding process type (e.g., via the process selector button 40), the welding-type system 10 determines the selected welding process type and, based on the preferences and/or experience of the logged in user, selectively displays the setup graphic via the color display screen 48.

Figure 10:
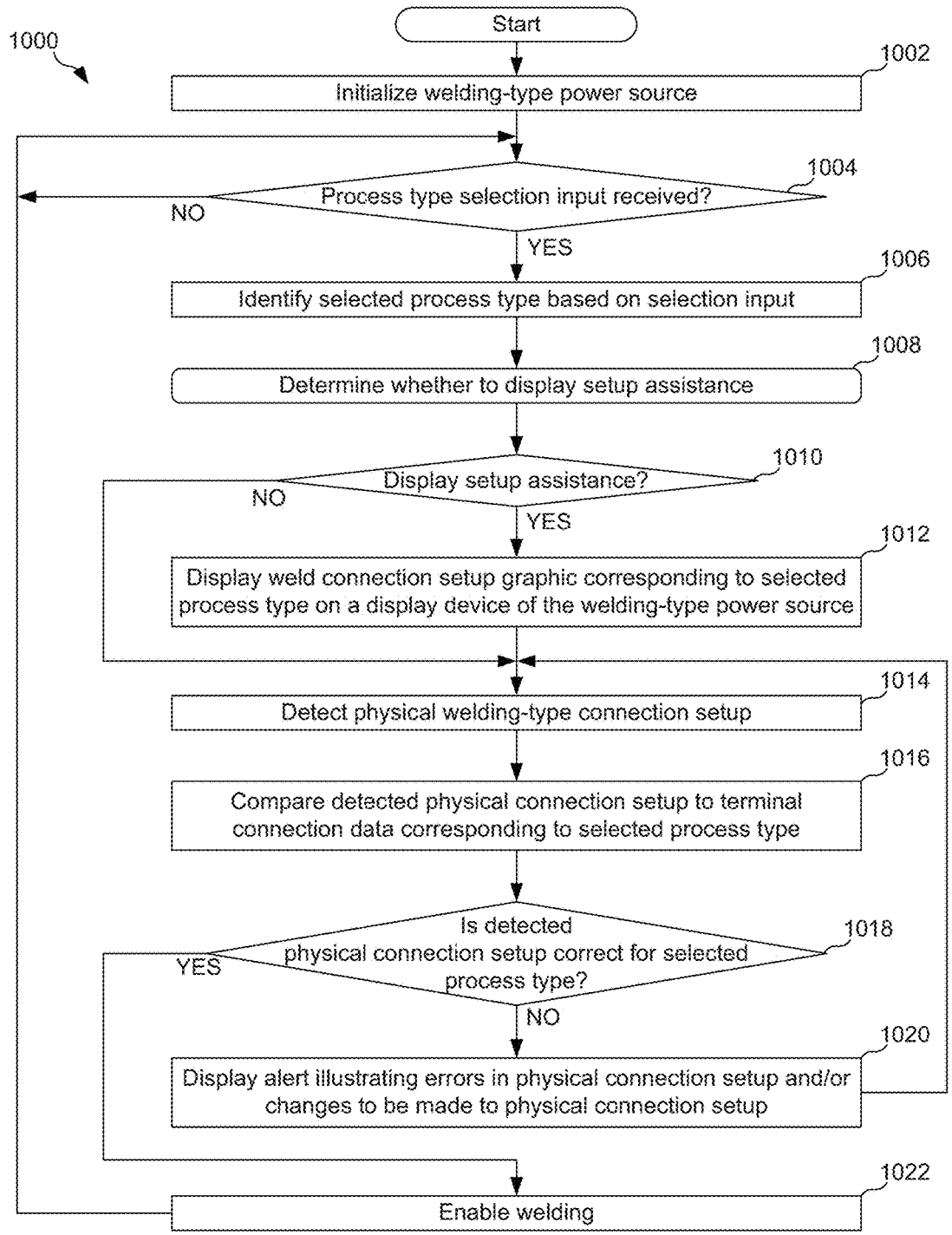
FIG. 10 is a flowchart representative of example method to display physical welding connection information on an interface of the welding-type system of FIG. 1.

FIG. 10 is a flowchart representative of example method 1000 to display physical welding connection information on an interface of the welding-type system of FIG. 1. The method 1000 of FIG. 10 may be implemented by the processor 36 of FIG. 1 executing machine readable instructions stored in the memory 34 or another non-transitory machine readable storage medium.

At block 1002, the processor 36 initializes the welding-type power source 16. For example, when the power source 16 is powered on, the processor 36 performs a boot sequence, diagnostic checks, and/or other setup procedures to prepare the power source 16 for welding. At block 1004, the processor 36 determines (e.g., via the interface 38) whether a process type selection input has been received. For example, the processor 36 may monitor for an input at the welding process selector 40 that causes a change in the selected welding process type. If a process type selection input has not been received (block 1004), control returns to block 1004. In some examples, the processor 36 handles any other inputs received via the interface 38 in addition to monitoring for a process type selection input.

When a process type selection input is received (block 1004), at block 1006 the processor 36 identifies a selected process type based on the selection input. For example, the processor 36 determines which of the process types was selected via the welding process selector 40. At block 1008, the processor 36 determines whether to display setup assistance. An example method to implement block 1008 is disclosed below with reference to FIG. 11.

If the processor 36 determines that the setup assistance is to be displayed (block 1010), at block 1012 the color display screen 48 displays a weld connection setup graphic corresponding to the selected process type. For example, the processor 36 may retrieve a pre-rendered image (e.g., the images 62, 76, 80, 84, and/or 86 of FIGS. 3-7) and/or one or more pre-rendered graphics (e.g., the components 64, 66, 68, 70, 72, 74, 78, 82, 88 of FIGS. 3-7) from the memory 34 and/or another machine readable storage device. The processor 36 assembles the components, if not included in an image, and displays the pre-rendered image(s) and/or component(s) via the color display screen 48.

After displaying the weld connection setup graphic (block 1012), or if setup assistance is not displayed (block 1010), at block 1014 the processor 36 detects a physical welding-type connection setup. For example, the processor 36 may detect impedance values of components connected to positive and/or negative voltage terminals of the power source 16. At block 1016, the processor 36 compares the detected physical connection setup to terminal connection data corresponding to the selected process type. For example, the processor 36 may retrieve terminal connection data from the memory 34 or other storage device that identifies the physical connections to be made between expected components and the voltage terminals for a selected welding process type.

At block 1018, the processor 36 determines whether the detected physical connection setup is correct for the selected process type based on the comparison of the detected physical connection setup and the terminal connection data. If the detected physical connection setup is incorrect (block 1018), at block 1020 the processor 36 displays an alert (e.g., on the user interface 38) identifying errors in the physical connection setup and/or changes to be made to the physical connection setup. For example, as discussed above in conjunction with FIG. 8, the color display screen 48 may display a graphic indicating the location of the error and/or alternate between displaying a physical connection graphic and displaying a correction graphic.

If the detected physical connection setup is correct (block 1018), at block 1022 the processor 36 enables welding at the power source 16. Control then returns to block 1004 to monitor for process type selection inputs.

Figure 11:
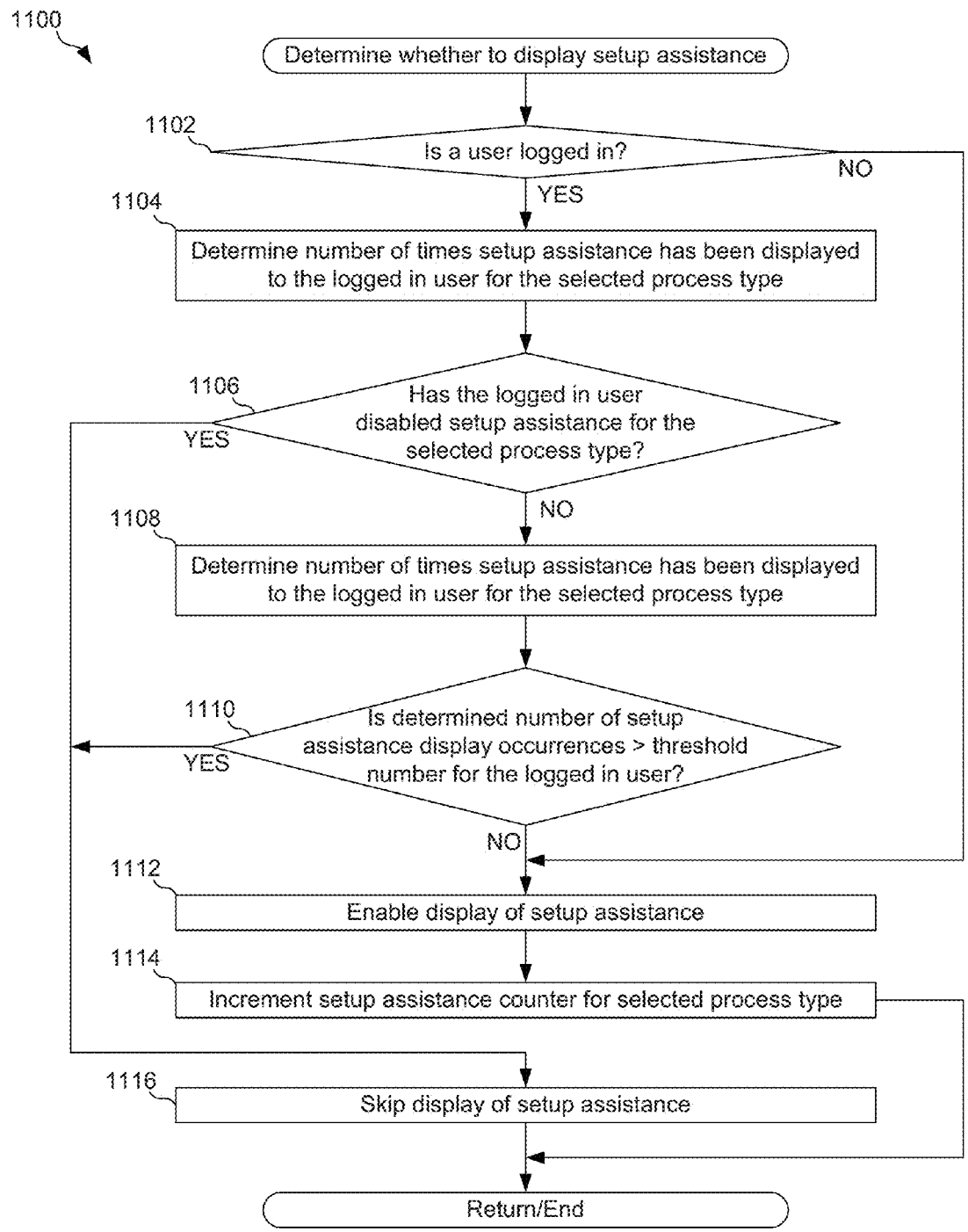
FIG. 11 is a flowchart representative of example method to selectively enable display of a setup assistance interface.

FIG. 11 is a flowchart representative of example method 1100 to selectively enable display of a setup assistance interface. The method 1100 may be performed to implement block 1008 of FIG. 10. The method 1100 of FIG. 11 may be implemented by the processor 36 of FIG. 1 executing machine readable instructions stored in the memory 34 or another non-transitory machine readable storage medium.

At block 1102, the processor 36 determines whether a user is logged in. For example, the processor 36 may determine whether a user was selected in a user selection screen via the interface 38. If a user is logged in, at block 1104 the processor 36 determines the number of times setup assistance has been displayed to the logged in user for the selected process type. For example, when a welding process type is selected while the user is logged in, the processor 36 retrieves from the memory 34 user preferences indicating whether setup assistance is to be displayed and/or a count of times the setup assistance has been displayed to the logged in user for the selected welding process type.

At block 1106, the processor 36 determines whether the logged in user has disabled setup assistance for the selected process type. For example, the processor 36 may identify a user preference for setup assistance, generally and/or for the selected welding process type. Example user preference settings include disabling setup assistance, enabling setup assistance, and/or default settings (e.g., a default number of setup assistance instances, after which setup assistance is not displayed for the user). If the logged in user has not disabled setup assistance for the selected process type (block 1106), at block 1108 the processor 36 determines the number of times the setup assistance has been displayed to the logged in user for the selected process type.

At block 1110, the processor 36 determines whether the number of setup assistance display occurrences is greater than the threshold number for the logged in user. If the number of setup assistance display occurrences is not greater than the threshold number for the logged in user (block 1110), or if there is no user logged in, at block 1112 the processor 36 enables display of setup assistance.

At block 1114, the processor 36 increments a setup assistance counter for the selected process type and/or for a logged in user. The setup assistance counter may be stored in the memory 34 and/or a storage device, and may be compared during subsequent uses of the welding-type system 10 (e.g., block 1110) to determine whether to enable display of setup assistance. In some examples, block 1114 may be omitted (e.g., if no user is logged in for tracking a number of times the setup assistance is display).

If the logged in user has disabled setup assistance for the selected process type, or if the number of setup assistance display occurrences is greater than the threshold number for the logged in user (block 1110), at block 1116 the processor 36 skips (e.g., disables) display of the setup assistance for the selected welding process type.

After skipping (e.g., disabling) the display of setup assistance (block 1116), and/or after incrementing the setup assistance counter for the selected process type (block 1114), the example method 1100 may end and/or return control to a calling function (e.g., block 1008 of FIG. 10).

While the examples described herein are discussed with reference to rendered images, other examples include using photographs and/or photographic-quality images of the components instead of rendered images and/or component graphics. Additionally or alternatively, disclosed examples may use videos and/or animation instead of the rendered images and/or component graphics.

The examples described herein provide an intuitive and flexible graphical user interface for setting welding parameters for various processes, material types, material thicknesses, gas types, electrode types, and electrode diameters. The embodiments described herein provide a quick and simple means for setting welding parameters to a novice operator, or even an experienced operator, who may be unfamiliar with a certain welding process. The embodiments described herein further display color graphical representations of recommended welding parameter ranges of values, and display when the given welding parameters are at the appropriate or optimal settings. The graphical user interface is also configured to render additional instruction and guidance to the operator for a given selected welding process. The embodiments described herein also give the operator a simple means to enable or disable the Auto-Set function, such that the operator may take advantage of the automatic setting of welding parameters, or make use of the traditional manual setting of the welding parameters.

The present methods and/or systems may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory computer readable medium" is defined to include all types of computer readable storage media and to exclude propagating signals.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply interface device, comprising:
    a welding process selection input device;
    a display device;
    a memory configured to store a plurality of weld connection setup graphics, each of the plurality of the weld connection setup graphics being a graphic of a perspective view of a welding power supply and one or more physical welding connections to be made by an operator at the welding power supply to set up the welding power supply to perform a corresponding welding process type; and
    a processor configured to:
        in response to identifying a selected welding process type via the welding process selection input device, display one of the plurality of the weld connection setup graphics via the display device, wherein the one of the plurality of the weld connection setup graphics includes perspective views of first and second physical terminals and a perspective view of a weld torch corresponding to the selected welding process type;
        detect a physical welding connection made at the welding power supply;
        determine, based on the detected physical welding connection, that the detected physical welding connection is incorrect for the selected welding process type by:
            determining terminal connection data corresponding to the one of the plurality of the weld connection setup graphics; and
            determining that an actual weld torch is connected to a first terminal that is different than a second terminal depicted in the one of the plurality of the weld connection setup graphics based on the terminal connection data and based on the detected physical welding connection; and
        display an alert on the display device to indicate an error in the detected physical welding connection.

2. The welding-type power supply interface device as defined in claim 1, wherein the one of the plurality of the weld connection setup graphics includes perspective views of first and second physical terminals and a perspective view of a weld torch corresponding to the selected welding process type.

3. The welding-type power supply interface device as defined in claim 1, wherein the processor is configured to display the alert on the display device by displaying an animation or a video illustrating changing the detected physical welding connection to a correct physical welding connection matching the terminal connection data.

4. The welding-type power supply interface device as defined in claim 1, wherein the processor is configured to display the alert on the display device by displaying an updated graphic to visually indicate a location of the error, the displaying of the updated graphic including flashing a component of the updated graphic corresponding to the error on the display device.

5. The welding-type power supply interface device as defined in claim 1, wherein the one of the plurality of the weld connection setup graphics is an animation or a video illustrating the physical welding connection at the welding power supply.

6. A welding-type power supply interface device, comprising:
 a welding process selection input device;
 a second input device;
 a display device;
 a memory configured to store a plurality of weld connection setup graphics, each of the plurality of the weld connection setup graphics being a graphic of a perspective view of a welding power supply and one or more physical welding connections to be made by an operator at the welding power supply to set up the welding power supply to perform a corresponding welding process type; and
 a processor configured to:
  identify a current user of the welding power supply based on a first input from the second input device;
  compare a first number of times one of the plurality of the weld connection setup graphics has been displayed while the current user is logged in to the welding power supply to a display threshold;
  in response to identifying a selected welding process type via the welding process selection input device, display the one of the plurality of the weld connection setup graphics via the display device when the first number does not satisfy the display threshold;
  detect a physical welding connection made at the welding power supply;
  determine, based on the detected physical welding connection, that the detected physical welding connection is incorrect for the selected welding process type; and
  display an alert on the display device to indicate an error in the detected physical welding connection.

7. The welding-type power supply interface device as defined in claim 6, wherein the processor is configured to:
 identify the current user of the welding power supply based on a second input from the second input device after the first input; and
 display weld operating parameters corresponding to the selected welding process type on the display device, without displaying the one of the plurality of the weld connection setup graphics, when the first number satisfies the display threshold.

8. The welding-type power supply interface device as defined in claim 1, further comprising a communications device configured to communicate with the welding power supply via wired communications or wireless communications.

9. The welding-type power supply interface device as defined in claim 1, wherein the display device comprises a color display device.

10. The welding-type power supply interface device as defined in claim 1, wherein the one of the plurality of the weld connection setup graphics comprises at least one of a first connection between a weld cable and a positive polarity or negative polarity power supply terminal, a second connection between the weld cable and a wire feeder, or a third connection between a work clamp and the positive polarity or the negative polarity power supply terminal.

11. A welding-type power supply, comprising:
 a power source configured to provide welding power to a welding process;
 a welding process selection input device;
 a display device;
 a memory configured to store a plurality of weld connection setup graphics, each of the plurality of the weld connection setup graphics being a graphic of a perspective view of the welding-type power supply and one or more physical welding connections to be made by an operator at the welding-type power supply to set up the welding-type power supply to perform a corresponding welding process type; and
 a processor configured to:
  in response to identifying a selected welding process type via the welding process selection input device, retrieve one of the plurality of the weld connection setup graphics from the memory;
  display the one of the plurality of the weld connection setup graphics via the display device;
  detect a physical welding connection made at the welding-type power supply;
  determine, based on the detected physical welding connection, that the detected physical welding connection is incorrect for the selected welding process type by:
   determining terminal connection data corresponding to the one of the plurality of the weld connection setup graphics; and
   determining that an actual weld torch is connected to a first terminal that is different than a second terminal depicted in the one of the plurality of the weld connection setup graphics based on the terminal connection data and based on the detected physical welding connection; and
  display an alert on the display device to indicate an error in the detected physical welding connection.

12. The welding-type power supply as defined in claim 11, wherein the one of the plurality of the weld connection setup graphics includes perspective views of first and second physical terminals and a perspective view of a weld torch corresponding to the selected welding process type.

13. The welding-type power supply as defined in claim 11, wherein the processor is configured to display the alert on the display device by displaying an animation or video illustrating changing the detected physical welding connection to a correct physical welding connection matching the terminal connection data.

14. The welding-type power supply as defined in claim 11, wherein the processor is configured to display the alert on the display device by displaying an updated graphic to visually indicate a location of the error, the displaying of the updated graphic including flashing a component of the updated graphic corresponding to the error on the display device.

15. The welding-type power supply as defined in claim 11, wherein the one of the plurality of the weld connection setup graphics is an animation or video illustrating the physical welding connection at the welding-type power supply.

16. A welding-type power supply, comprising:
 a power source configured to provide welding power to a welding process;

a welding process selection input device;
a second input device;
a display device;
a memory configured to store a plurality of weld connection setup graphics, each of the plurality of the weld connection setup graphics being a graphic of a perspective view of the welding-type power supply and one or more physical welding connections to be made by an operator at the welding-type power supply to set up the welding-type power supply to perform a corresponding welding process type;
a processor configured to:
  identify a current user of the welding-type power supply based on a first input from the second input device;
  compare a first number of times the one of the plurality of the weld connection setup graphics has been displayed while the current user is logged in to the welding-type power supply to a display threshold;
  in response to identifying a selected welding process type via the welding process selection input device, display the one of the plurality of the weld connection setup graphics via the display device when the first number does not satisfy the display threshold;
  detect a physical welding connection made at the welding power supply;
  determine, based on the detected physical welding connection, that the detected physical welding connection is incorrect for the selected welding process type; and
  display an alert on the display device to indicate an error in the detected physical welding connection.

17. The welding-type power supply as defined in claim 16, wherein the processor is configured to:
identify the current user of the welding-type power supply based on a second input from the second input device after the first input; and
display weld operating parameters corresponding to the selected welding process type on the display device, without displaying the one of the plurality of the weld connection setup graphics, when the first number satisfies the display threshold.

18. The welding-type power supply as defined in claim 11, wherein the one of the plurality of the weld connection setup graphics comprises at least one of a first connection between a weld cable and a positive polarity or negative polarity power supply terminal, a second connection between the weld cable and a wire feeder, or a third connection between a work clamp and the positive polarity or the negative polarity power supply terminal.

* * * * *